United States Patent [19]
Troy

[11] 3,868,285
[45] Feb. 25, 1975

[54] METHODS AND APPARATUS FOR THE MANUFACTURE OF CELLULAR CUSHIONING MATERIALS

[76] Inventor: Constantine T. Troy, 1330 Cleveland Ave., Wyomissing, Pa. 19610

[22] Filed: July 18, 1973

[21] Appl. No.: 380,303

[52] U.S. Cl.............. 156/147, 156/290, 156/553, 156/583
[51] Int. Cl...................... A63b 41/00, B32b 31/00
[58] Field of Search .......... 156/145, 211, 147, 229, 156/156, 290, 553, 494, 583, 497, 582; 264/96

[56] References Cited
UNITED STATES PATENTS

| | | | |
|---|---|---|---|
| 2,682,294 | 6/1954 | Langer | 156/583 |
| 2,904,100 | 9/1959 | Fener | 156/583 |
| 3,112,586 | 12/1963 | Luetzow | 156/583 |
| 3,170,832 | 2/1965 | Wilson et al. | 156/290 |
| 3,575,757 | 4/1971 | Smith | 156/147 |
| 3,660,189 | 5/1972 | Troy | 156/145 |
| 3,703,430 | 11/1972 | Rich | 156/497 |
| 3,776,804 | 12/1973 | Monahan et al. | 156/583 |

FOREIGN PATENTS OR APPLICATIONS

| | | | |
|---|---|---|---|
| 864,173 | 3/1961 | Great Britain | 156/290 |
| 711,429 | 6/1954 | Great Britain | 156/582 |

Primary Examiner—Douglas J. Drummond
Assistant Examiner—J. Gallagher
Attorney, Agent, or Firm—Synnestvedt & Lechner

[57] ABSTRACT

Apparatus for making cellular cushioning materials in two primary steps. In the first step, two sheets of thermoplastic film integrally joined or otherwise sealed at their edges to form a tube are joined at spaced locations by crosswise heat seals to form a prefabricated structure suitable for shipping in dense roll form. In the second step, the spaces between the crosswise heat seals are filled with an elastic substance, such as air or other gas, and continuous seals are made lengthwise of the prefabricated structure, subdividing the filled spaces into individually sealed inflated cells.

14 Claims, 16 Drawing Figures

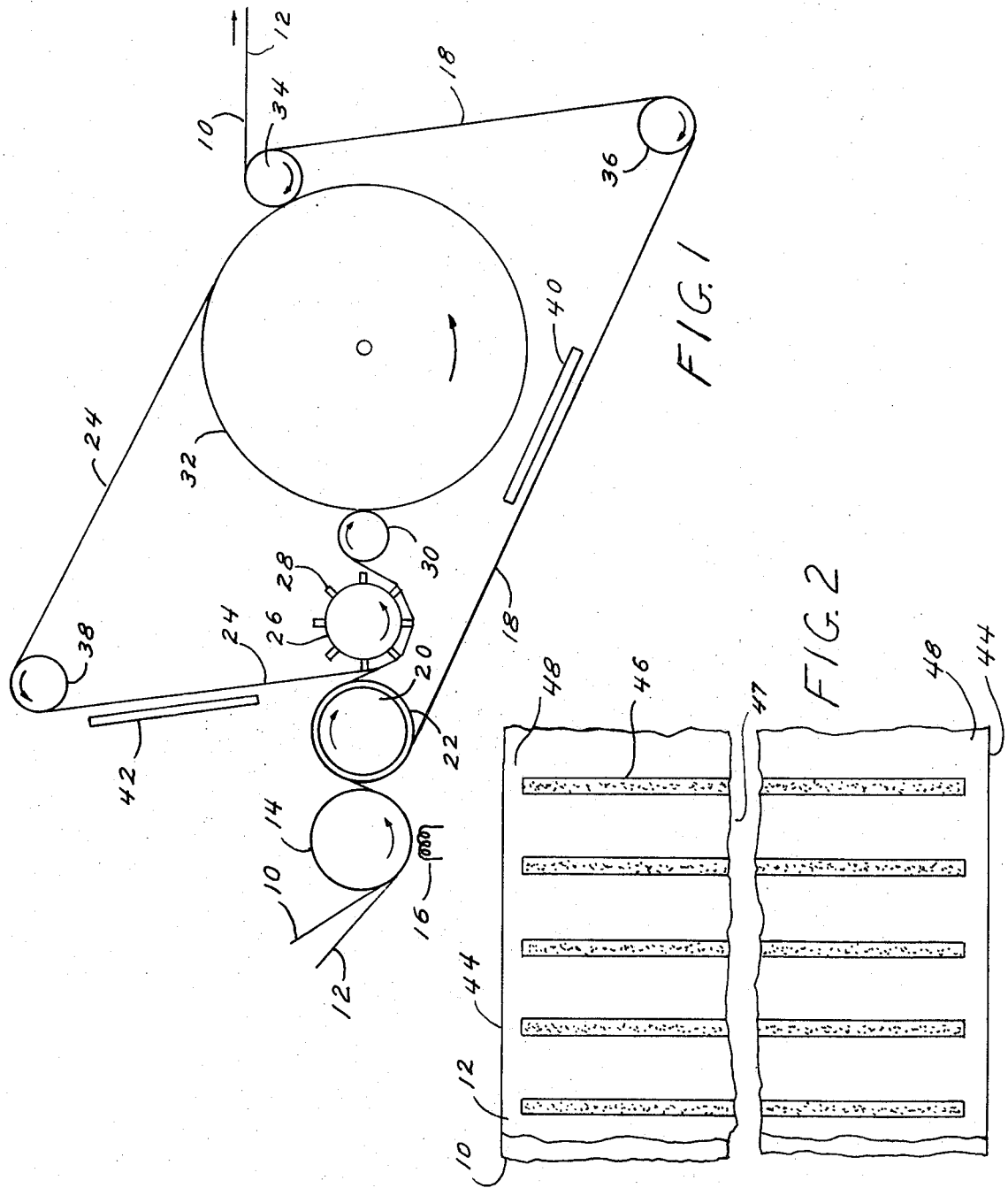

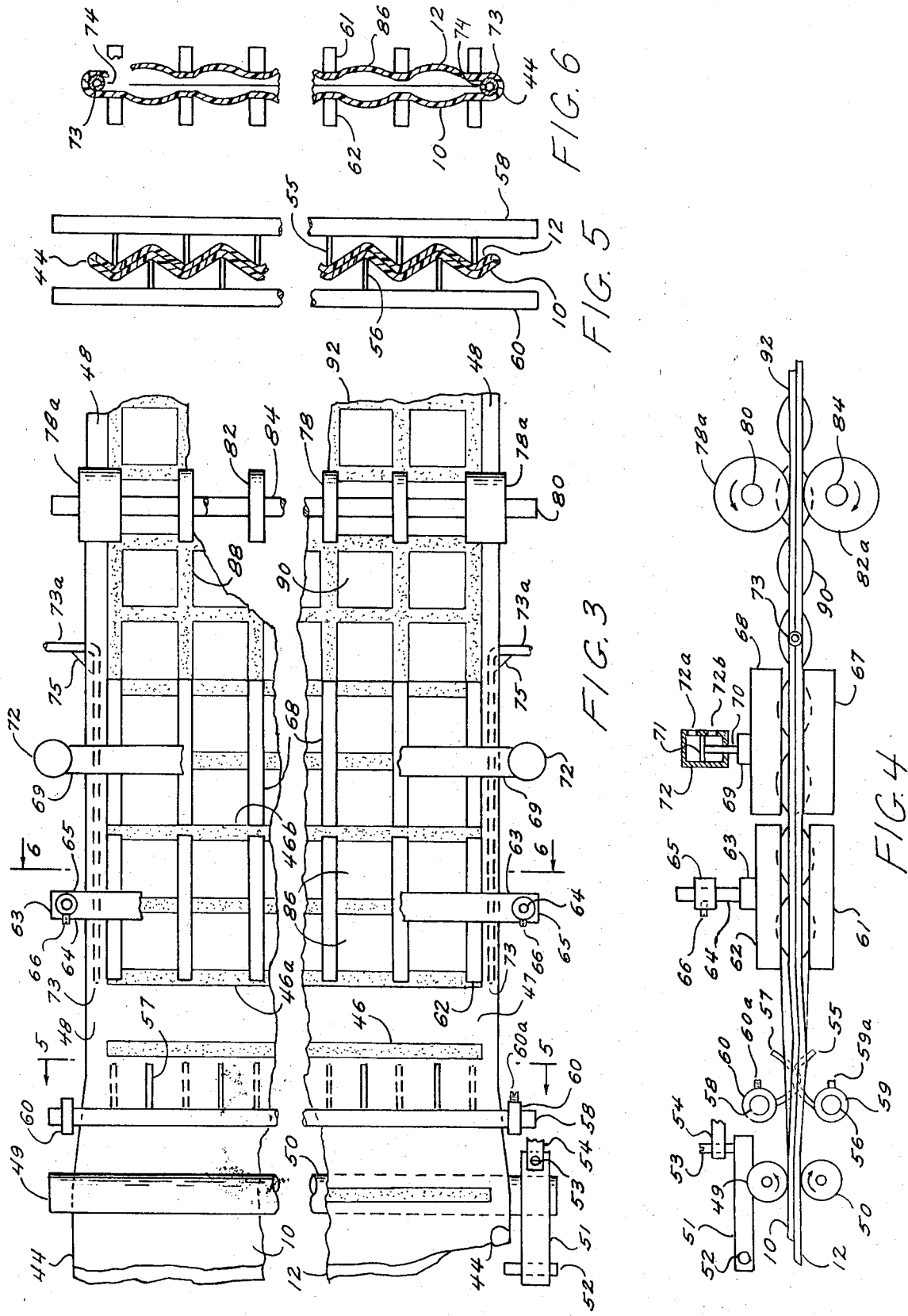

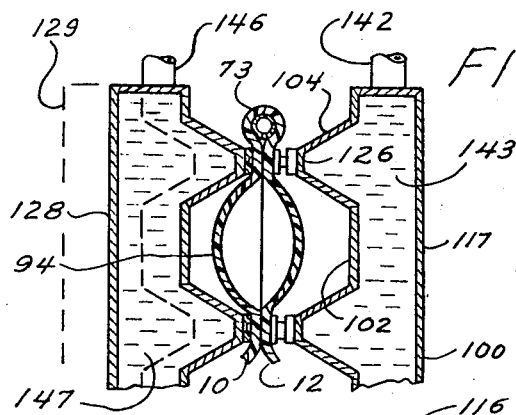
FIG. 7
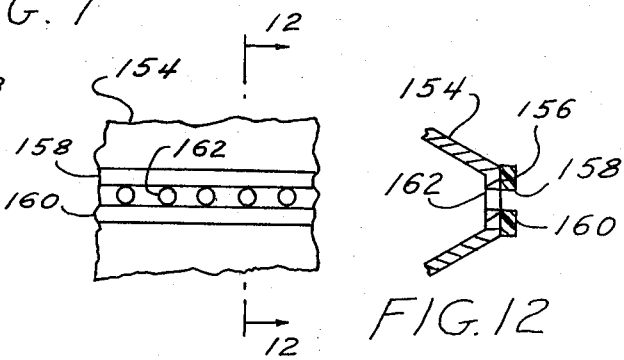
FIG. 11
FIG. 12
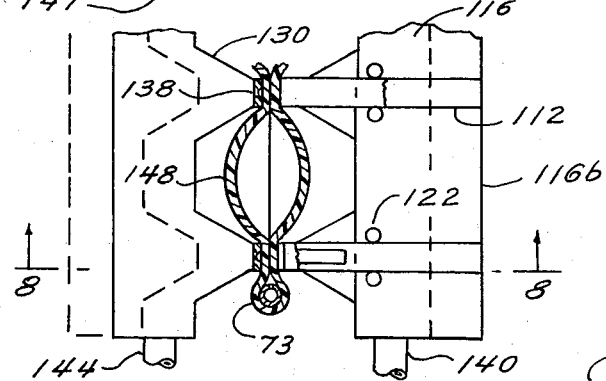
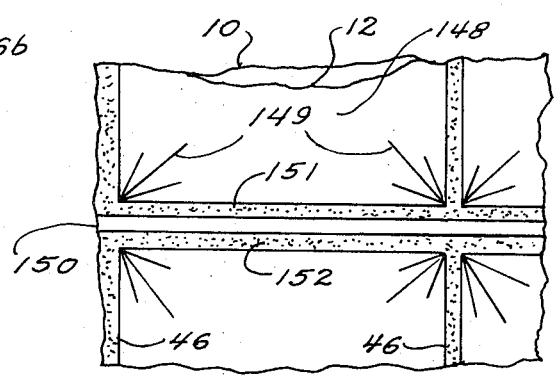
FIG. 10
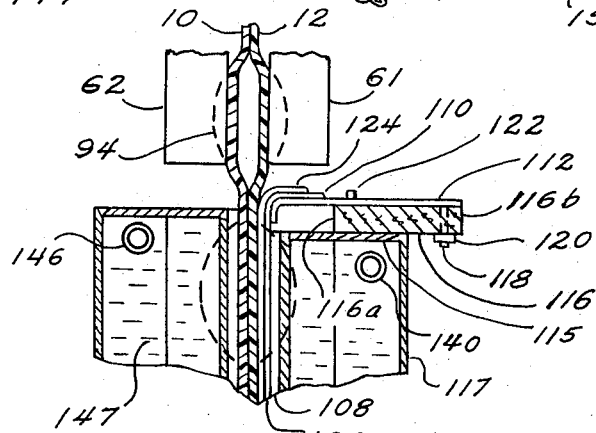
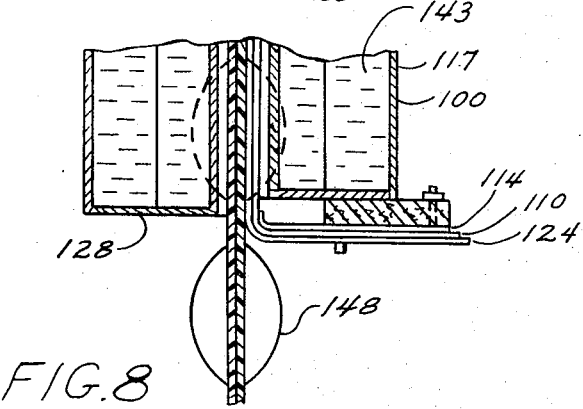
FIG. 8
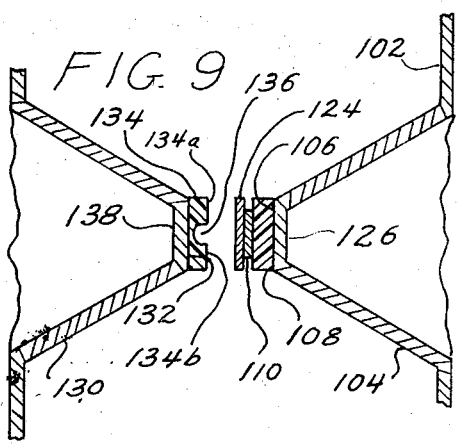
FIG. 9

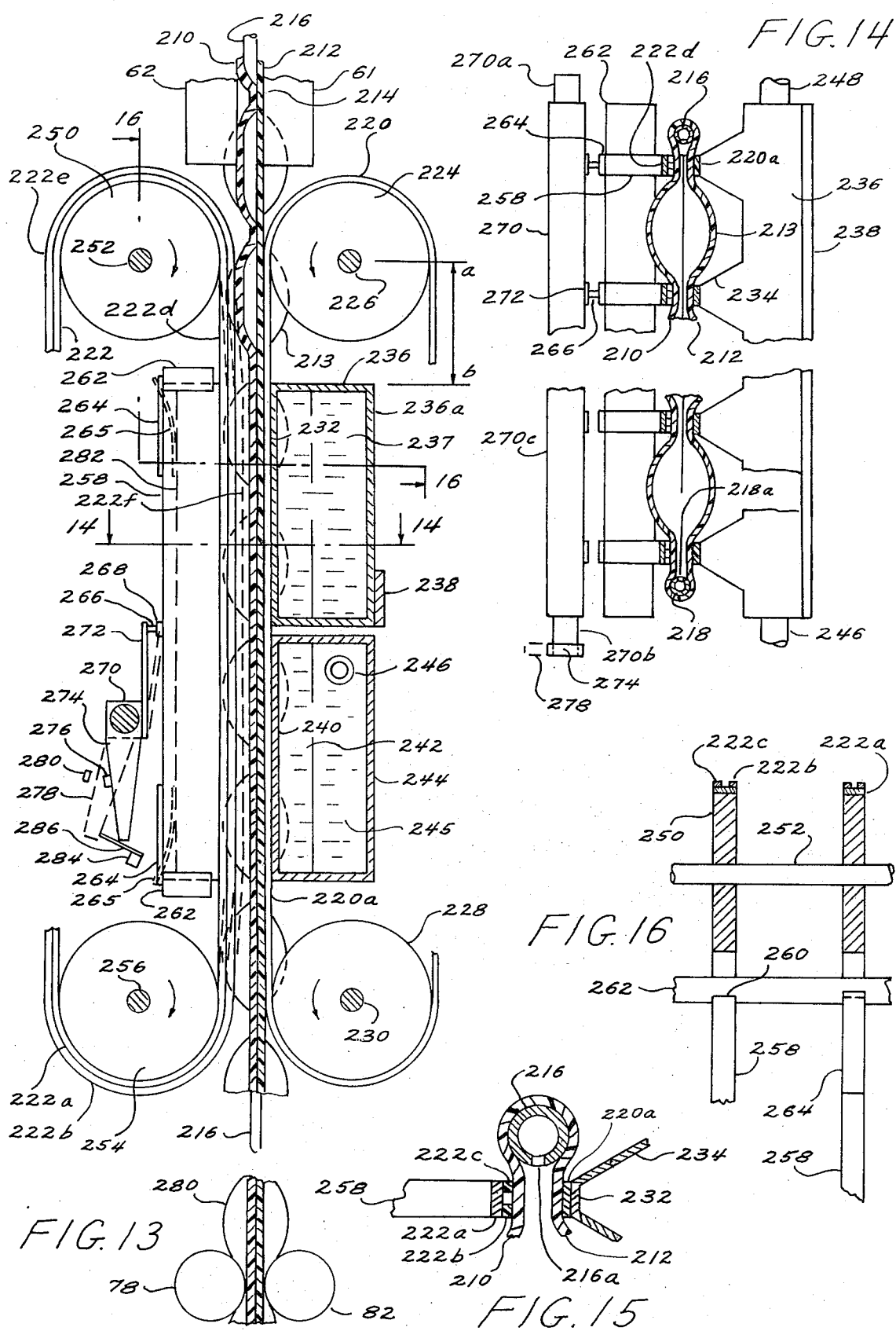

METHODS AND APPARATUS FOR THE MANUFACTURE OF CELLULAR CUSHIONING MATERIALS

BACKGROUND OF THE INVENTION

1. Field of the Invention

The invention relates to methods and apparatus for the production of closed-cell cushioning material, the material comprising unembossed sheets or films joined adjacent their longitudinal edges and defining a plurality of individual sealed cells, each cell being filled with an elastic substance, such as air or other gas under pressure.

2. Description of the Prior Art

Cushioning materials of the general type with which the instant invention is concerned and methods and apparatus for their manufacture are disclosed in my U.S. Pat. No. 3,660,189 entitled "Closed-Cell Structure and Methods and Apparatus for its Manufacture." As explained in my prior patent, the cellular cushioning material is made in two major steps. In the first step, a preform or prefabricated structure is produced formed of superposed sheets of a thermoplastic film integrally joined or otherwise sealed together along their margins, the films also being sealed together at intervals along lines extending transversely of the sheets, such lines terminating short of the margins. In certain of the embodiments disclosed, the sheets are embossed between the cross seals to form a series of embryo cells. The embossing of the cell outlines is disadvantageous in that it requires that films of relatively greater thickness than would normally be necessary be employed due to the thinning out of the film at the central portion of each cell, resulting in a waste of the film material. Embossing is also disadvantageous in that it requires costly equipment accounting for the greater share of the investment in apparatus required for making cushioning material. Also, the temperatures and speeds of the embossing process must be continuously and carefully controlled.

OBJECTS OF THE INVENTION

A primary object of the instant invention is the provision of a method and apparatus for making cellular cushioning material from flat film stock which requires no embossing operation, whereby each cell is of substantially uniform wall thickness throughout and the yield in cubic feet of cushioning material per pound of film is hence relatively high.

Another object of the invention is the provision of methods and apparatus for attaining the foregoing object which include improved steps and means for inflating and sealing a prefabricated unembossed structure.

DEFINITIONS

As used in the description of the invention and the appended claims, the following terms have the following meanings:

"Prefab" refers to a partially fabricated cushioning structure made from a pair of plastic films joined together along a series of parallel spaced lines to form elongated pockets or channels that are adapted to be inflated with an elastic material sealed into a plurality of closed cells.

"Long seal" refers to a line along which two sheets of film are joined in the direction of their lengthwise (machine) direction.

"Cross seal" refers to a line along which the two sheets of film are joined in the direction of their widthwise (cross-machine) direction.

"Cross channel" refers to the unsealed space between adjacent cross seals.

"Marginal seal" refers to the connection of superposed sheets at their longitudinal edges which may be an integral connection as where the sheets are the opposed sides of a flattened tube or a connection attained by heat sealing two individual film sheets along their margins.

SUMMARY OF THE INVENTION

The above and other objects of the invention are attained by the method and apparatus of the invention in the use of which a prefab is first produced comprising superposed sheets of a thermoplastic film, as, for example, polyethylene film, the sheets having marginal seals and spaced transverse or cross seals terminating adjacent to but spaced from the marginal seals, the cross seals defining cross channels.

The method and apparatus of the invention includes the steps of and means for converting the prefab into a cellular cushioning material, the method and apparatus being such that the prefab is first provided with a widthwise slackness by distorting it as by subjecting it, while it is maintained under longitudinal tension, to the action of a series of spaced intermeshing members, the series extending transversely or in a crosswise direction of the prefab. The prefab is then maintained in its relatively widthwise slackened condition by guide members which also serve the function of introducing a gas or other elastic substance under a desired pressure to the cross channels. During the introduction of the elastic material, the prefab is maintained against substantial inflation along spaced longitudinal lines by forming bars lying at substantially right angles to the cross seals. After the inflation step, the superposed sheets are brought into face to face contact on spaced longitudinal lines corresponding to the lines defined by the forming bars and are fused together to form long seals intersecting the cross seals whereby a multiplicity of individual inflated cells are obtained.

The fusing operation to produce the long seals is preferably performed by the known impulse method. In accordance with the preferred embodiment of the invention, the sealing apparatus includes a series of spaced, rigid, elongated sealing members, each carrying the electrically energized sealing means employed in the impulse method, and an opposed series of spaced pressure members, each pressure member supporting a flexible resilient insulating element, suitably composed of rubber, the insulating element being preferably in the form of spaced individual strips or a single strip with a central longitudinally-extending groove therein, the groove being of lesser width than the sealing ribbon and being opposite the center line of the latter. Such construction of the sealing unit permits the heating ribbons to conform when under pressure to the irregularities, such as wrinkles and folds, formed along the sealing lines upon contraction of the sheets or films upon the inflation of the individual embryo cells. It also provides seals of ideal construction inasmuch as the heat of fusion is greater opposite to the grooves in, or the spaces between, the strips of the resilient elements carried by the pressure members due to the slower dissipation of heat along the lines of such grooves or spaces.

DESCRIPTION OF THE DRAWINGS

FIG. 1 is a front elevation of an apparatus for making a prefab;

FIG. 2 is a plan view of the prefab made by the apparatus of FIG. 1;

FIG. 3 is a plan view with parts broken away and FIG. 4 a front elevation of a conversion apparatus for converting the prefab of FIG. 2 into cushioning, the conversion apparatus comprising a cell-shaping section and a sealing section;

FIG. 5 is a sectional view taken on the line 5—5 of FIG. 3 and looking in the direction indicated by the arrows;

FIG. 6 is a sectional view taken on the line 6—6 of FIG. 3 and looking in the direction indicated by the arrows;

FIG. 7 is a plan view, partly in section, of an alternate construction of the sealing section of the conversion apparatus with film sheets in position for sealing;

FIG. 8 is a sectional view taken on the line 8—8 of FIG. 7 looking in the direction indicated by the arrows;

FIG. 9 is a detailed sectional view on an enlarged scale of a portion of the apparatus of FIG. 7 with the film sheets omitted;

FIG. 10 is a plan view of a typical seal made by the apparatus of FIG. 7 between air-filled cells of the cushioning;

FIG. 11 is a plan view of an optional construction of a portion of the equipment shown in FIG. 9;

FIG. 12 is a sectional view taken on the line 12—12 of FIG. 11 and looking in the direction indicated by the arrows;

FIG. 13 is a side elevation, partly in section, of another alternate construction of the sealing section of the conversion apparatus;

FIG. 14 is a horizontal sectional view taken on the line 14—14 of FIG. 13 and looking in the direction indicated by the arrows;

FIG. 15 is an enlarged detailed sectional view of a portion of the apparatus of FIG. 14; and FIG. 16 is a vertical elevation, partly in section, taken on the line 16—16 of FIG. 13 and looking in the direction indicated by the arrows.

In the following description of the apparatus, various parts thereof are referred to as "stationary" parts. The term "stationary" as so used denotes that the parts referred to are supported by suitable means (not shown) in fixed positions by the frame or other elements (not shown) of the apparatus.

For the production of the prefab, an apparatus as disclosed in FIG. 1 is preferably employed. A top sheet 10 of a thermoplastic film superposed on a bottom sheet 12 of such film enter the apparatus at the left and travel around the roll 14. In the case where separate sheets are employed, the margins of the film sheets are sealed together during their travel around the roll 14 by heat radiated from two resistance coils 16 through which an electric current is passed, one of the coils 16 being located near each end of the roll 14 and adjacent the line of travel of the margins of the film sheets 10 and 12. The sheets 10 and 12 then progress to an endless belt 18 on which they are carried part way around a roll 20 which is covered with a rubber layer 22. Near the end of their travel around the roll 20 the sheets pass under a second endless belt 24 for confinement between it and the belt 18.

The belts 18 and 24 then carry the sheets 10 and 12 around a sealing roll 26 on which are fixed axially aligned sealing bars 28 which make cross seals between the sheets. As the belts 18 and 24 leave the sealing roll 26, they carry the sheets 10 and 12 around a roll 30 and then around a cooling roll 32 to the vicinity of a stripping roll 34 where the belts 18 and 24 separate, allowing the sheets, now forming a prefab, to leave the apparatus to a wind-up mechanism (not shown). The resulting dense rolls of prefab may then be shipped to users.

The belt 18, in its return path from the roll 34, passes around a tensioning roll 36 then back to the roll 20. The belt 24 returns in similar fashion around a tension roll 38. The belts 18 and 24 are preferably made of a Tefloncoated glass fabric from 5 to 10 mils in thickness. The resistance coils 16 used for sealing the margins of the film sheets may be replaced by gas flames, if desired, these and similar devices which will cause fusion of the films being well known in the art. The various rolls are preferably made of metal and are connected by gearing which is driven by a suitable drive means, such as a motor (not shown), for rotation at the same surface speeds in the directions of the arrows. The cooling roll 32 is preferably a hollow drum through which a cooling liquid may be circulated. If desired, the tensioning rolls 36 and 38 may be similarly constructed.

Each sealing bar 28, or at least its outer surface, is continuously heated. For this purpose, each bar 28 preferably carries on its outer surface a rubber insulating strip on which is tensioned an electrically heated metal ribbon, these elements not being shown as they are well known in the art. To facilitate the sealing of relatively thick films, a radiant heater 40 of any desired type may be supported by suitably means (not shown) near the return path of the belt 18 and a similar heater 42 supported near the return path of the belt 24. Thus, the belts may be preheated to bring the film sheets nearly to sealing temperature before they are pressed against the hot sealing bars 28. When the belt 18 is heated, its heat is conserved by the insulating rubber layer 22 on the roll 20.

If desired, the roll 20 may be supported by suitable mechanism (not shown) so that it may be adjustably positioned at any desired spacing from the sealing roll 26 thus bringing the belts 18 and 24 and the film sheets 10 and 12 between them against the sealing bars 28 with any desired degree of pressure.

Common practice in making linear heat seals is to apply a heated bar to the films for about one-tenth second and then remove it and cool the seal for about one-half second or more. Using these intervals for heating and cooling the sealed areas, the general dimensions of the apparatus can be roughed out for various film speeds. For example, for a film speed through the apparatus of 500 feet per minute, the diameter of the sealing roll 26 would be about 7 inches and that of the cooling roll 32 about 35 inches.

The assembled sheets 10 and 12 leaving the apparatus constitute the prefab disclosed in FIG. 2. The prefab embodies marginal seals 44, cross seals 46 and cross channels 47, the cross seals and cross channels extending across the major portion of the width of the sheets but ending a short distance from the marginal seals 44, thus leaving an unsealed area or long channel 48 between the ends of the cross seals 46 and each of the marginal seals 44. By providing a suitable number of sealing rolls 26, each having a different spacing of sealing bars 28, their use may be alternated in one apparatus, thus enabling it to produce a variety of prefabs, each having a different spacing of the cross seals 46.

It will be apparent that after the margins of the sheets 10 and 12 are sealed together by the heat from the resistance coils 16, they form what is, in effect, a flattened tube. If desired, the marginal sealing equipment may be eliminated and a flattened film tube in which the superposed sheets thereof are integrally joined at their edges, presented to the belts 18 and 24 to be transported through the apparatus and given cross seals as before to produce the prefab disclosed in FIG. 2. In FIGS. 5, 6, 7, 14 and 15, for ease of illustration, the prefab is shown as such an integrally formed tube.

Each user may convert the prefab into cushioning with the conversion apparatus shown in FIGS. 3 to 6. In the drawings, this apparatus is shown oriented so that the film sheets comprising the prefab travel horizontally. However, if desired, the same apparatus may be oriented so that the film sheets travel vertically.

The film sheets 10 and 12 comprising the prefab enter at the left as viewed in FIGS. 3 and 4 and pass between the pinch rolls 49 and 50, supported for rotation by suitable means (not shown). These rolls preferably are not driven but are free to turn on their axes. The upper roll 49 is supported in vertical registry with the lower roll 50 and its rotation is retarded by a brake 51. As viewed in the drawings, the left end of the brake 51 is pivoted on a stationary shaft 52 and the right end is forced against the roll 49 by a screw 53 threaded through a stationary bracket 54. Thus, the rotation of the pinch rolls 49 and 50 may be retarded as desired by adjusting the screw 53.

The sheets 10 and 12 then pass over a lower row of curved pins 55 fixed at spaced intervals along the length of a transverse shaft 56 and under an upper row of curved pins 57 similarly disposed on a shaft 58 in vertical registry with the shaft 56, the pins 57 being located in such manner as to be in staggered and meshing relationship with the pins 55.

The shaft 56 is adapted for rotation in the stationary spaced bearings 59, one of which is shown, and may be locked in any desired position by a setscrew 59a threaded through one of the bearings 59. The shaft 58 is similarly supported in stationary bearings 70 and locked in position by a setscrew 60a threaded through one of the bearings 60. Thus, by suitably rotating and locking the shafts 56 and 58, the degree of meshing of the pins 55 and 57 may be adjusted as desired.

Referring to FIG. 5, it will be seen that the pins 55 distort the sheets by pressing certain portions of the sheets 10 and 12 upwardly while the pins 57 press alternate portions downwardly, thus imposing on the sheets, as they leave the vicinity of the pins, a degree of waviness or slackness uniformly distributed across their width, proportional to the degree of meshing of the pins 55 and 57.

The sheets 10 and 12 next pass between an array of stationary lower forming bars 61 and an array of movable forming bars 62, the bars 61 and 62 being generally equal in length; this length, for convenience of illustration, being made equal to the distance between alternate cross seals such as 46a and 46b. The lower forming bars 61 are identical in all dimensions and are disposed in fixed positions in a row across the width of the sheets with their lengths aligned with the direction of travel of the sheets. The upper forming bars 62 correspond in all dimensions to the lower forming bars 61 and are disposed in vertical registry with them above the sheets, their lower surfaces lying in a plane parallel to but slightly above the plane of the margins of the sheets.

The upper forming bars 62 are supported by a cross member 63 which, in turn, is supported by the vertical shafts 64. The vertical shafts 64 are free to slide in the stationary bearings 65 and may be locked in any desired position by the set screws 66. Thus, the vertical spacing between the forming bars 61 and 62 may be regulated as desired. The bars 61 and 62 are located in what is termed the "cell-shaping section" of the conversion apparatus.

As the sheets 10 and 12 leave the cell-shaping section, they pass into what is termed the "sealing section." This comprises an array of stationary sealing bars 67 below the sheets and an array of vertically movable pressure bars 68, each in vertical registry with a sealing bar 67 above the sheets. The sealing bars 67 and pressure bars 68 are, respectively, aligned lengthwise with the forming bars 61 and 62. The pressure bars 68 are supported by a common cross member 69 supported in turn by the vertical piston rods 70 fixed to the pixtons 71 of the stationary cylinders 72. The cylinders 72 embody the ports 72a and 72b connected to a fluid supply by suitable leads (not shown), adapted, respectively, to admit fluid to the interior of the cylinders above and below the pistons 71. Fluid under controlled pressure may thus be admitted to the cylinders in such manner that the height of the pistons 71 may be controlled. Thus, the pressure bars 68 may be vertically reciprocated and caused to press the film sheets 10 and 12 against the sealing bars 67 with controlled pressure.

The sealing bars 67 are preferably adapted to accomplish heat sealing by the well known impulse method described in my said prior patent, but the apparatus may be suitably modified to use continuously heated sealing bars if desired. The length of the bars in the sealing section may differ from the length of the bars in the cell-shaping section, but, for ease of illustration, the same length is shown for all of the bars. Optionally, the lengthwise film sheet areas to be heat sealed may be preheated by heating the forming bars 61 and 62, thus shortening the sealing cycle.

Means, now to be described, are provided to guide the sheets 10 and 12 through the cell-shaping section and the sealing section. As shown in FIG. 3, the distance across the sheets between the outermost bars in these sections is equal to the length of a typical cross seal 46, leaving the long channels, defined by the outermost bars and the marginal seals, free to accomodate two margin guiding devices 73. Although one of these devices may be a rod, preferably both are in the form of tubes, as shown in FIGS. 3 and 6, and are termed "guide tubes." In FIG. 3 the free end of each guide tube 73 is located at the left near the point where the film sheets 10 and 12, in their travel, encounter the forming bars 61 and 62. From this point each guide tube 73 extends to the right, as shown in the drawing, for a distance equal to the combined length of the cell-shaping and sealing sections. Each guide tube 73 has a slot 74 (see FIG. 6) along its length to enable it to distribute air uniformly between the sheets. Near the point where the sheets leave the sealing section, the guide tubes 73 are bent at right angles away from and in the plane of the sheets, terminating in the legs 73a connected to an air supply (not shown) and supported by the guide tubes in the machine frame (not shown), thus holding the guide tubes in the desired position. On the legs 73a are fixed knives 75 adapted to sever the marginal seals 44 as the sheets leave the sealing section.

After the sheets leave the sealing section, they are gripped between the discs 78 fixed on the upper shaft 80 and discs 82 fixed on the lower shaft 84, the discs 78 and 82 being horizontally aligned, respectively, with the bars 68 and 67. The shafts 80 and 84 are adapted to be rotated in bearings (not shown) by a conventional drive (not shown). The discs 78a at the ends of the shaft 80 and the discs 82a at the ends of the shaft 84 are wide enough to span the marginal portions of the sheets 10 and 12 between the ends of the cross seals 46 and the marginal seals 44. Suitable mechanism (not shown) coordinates the rotation of the shafts 80 and 84 and the raising and lowering of the pressure bars 68.

The apparatus converts the prefab comprised of the sheets 10 and 12 into cushioning in step-by-step fashion. Each motion of the discs 78 and 82 establishes tension in the sheets and pulls them through the apparatus a distance equal to the length of the sealing section, the tension being maintained by the retarding action of the pinch rolls 49 and 50.

In the third step, the sample area enters the sealing section and pauses there while the pressure bars 68 descend, press the sheets 10 and 12 against the sealing bars 67 and then return to their original elevated positions, thus forming long seals 88 between the cells.

In the fourth step, the sheets comprising the individually sealed cells 90 leave the sealing section as the marginal seals 44 are severed by the knives 75. In the fifth step, the completed cushioning 92 passes between the discs 78 and 82 and leaves the apparatus to suitable winding mechanism (not shown).

To achieve the best results in making cushioning with a given cell size, each of the following factors should be properly adjusted and held constant for that particular cell size: First, the amount of crosswise slackness imposed on the sheets; second, the vertical spacing of the forming bars; third, the pressure of the injected air; and fourth, the amount of lengthwise tension applied to the film sheets. These factors generate opposing forces during the cell-shaping action. Thus, the most desirable cell-shaping action is the result of a proper balance of these forces: the internal air pressure tending to expand the cell walls, the constraining effect of the forming bars, and the constraining effects of the crosswise and lengthwise tensions extablished in the sheets.

To illustrate the desirability of properly adjusting these factors relative to each other, in one extreme condition a minimum quantity of air may be injected at relatively low pressure into the embryo cells and consequently the completely formed cells may be nearly flat, resembling slightly filled envelopes. The expansion of the cells being minimal, practically no crosswise slackness need be imposed on the sheets prior to inflation. Also, the upper forming bars 62 may desirably be positioned relatively close to the lower forming bars 61. The expansion of the embryo cells causes practically no lengthwise shrinking of the sheets, therefore little wrinkling and no folding of the sheets in the lengthwise areas to be long sealed. As a result, practically no lengthwise tension is required in the film sheets to even out and distribute wrinkles or folds in the areas to be long-sealed.

In the other extreme condition, a maximum quantity of air at relatively high pressure may be injected into the embryo cells and consequently the completely formed cells will take the form of well-filled pillows. The expansion of the cells being maximum, relatively great crosswise slackness, of the order of 6 percent to 9 percent of the width of the sheets, is required prior to inflation. Also, the upper forming bars 62 may desirably be positioned relatively far away from the lower forming bars 61 to provide space for the substantial number of wrinkles and folds that develop and to allow passage of air needed to inflate the cells, a passage that would otherwise be obstructed by the wrinkles and folds. Because the expansion of the embryo cells causes maximum lengthwise shrinkage and folding of the sheets in the areas to be long-sealed, relatively high lengthwise tension is desirable to even out and redistribute most effectively the wrinkles and folds so that high-strength, airtight seals may be made. This relatively high lengthwise tension presents haphazard folding in the areas to be longsealed and results in controlled folding which produces, desirably, for each cell one main fold at each cell corner.

Referring now to FIGS. 7 and 8, an alternative construction for the sealing section of the conversion apparatus is shown, the apparatus including a novel sealing element construction. As explained in connection with FIGS. 3 and 4, the equipment may be oriented so that the film sheets travel vertically, if desired. It will be assumed, therefore, that the cell-shaping section of the apparatus of FIGS. 3 and 4 is oriented vertically so that the film sheets 10 and 12 leave the forming bars 61 and 62 while travelling vertically downward in step-by-step fashion, as described in connection with FIG. 3.

In FIGS. 7 and 8, the film sheets 10 and 12, embodying the embryo cells 94 inflated through the guide tubes 73 are shown leaving the forming bars 61 and 62 and passing downward through the sealing section. The sealing section comprises a metal water jacket or tank 100 with generally rectangular horizontal and vertical sections and having a horizontal length spanning the width of the sheets 10 and 12. A vertical working face 102 embodies spaced parallel vertical ridges 104. Shown in detail in FIGS. 7, 8 and 9, a typical ridge 104 has a horizontal section in the shape of a truncated triangle with a flat top surface or land 106. Sealed to each land 106 is a rubber strip 108 against which is disposed a heating ribbon 110 held in tension by an upper leaf spring 112 and a lower leaf spring 114. Preferably, the ends of each heating ribbon 110 are copper-plated and soldered to the leaf springs in a jig before assembly to ensure proper tension in the ribbon. The heating ribbons are preferably energized by the impulse method.

As shown in FIGS. 7 and 8, affixed to the upper wall 115 of the tank 100 and extending crosswise of the film sheets 10 and 12 is a fiber strip 116 with its left edge 116a positioned above the tank face 102 and its right margin 116b projecting beyond the right wall 117 of the tank 100. The end of each upper leaf spring 112 opposite the heating ribbon 110 has an attaching stud 118 which passes through the fiber strip portion 116b and is secured by a nut 120. Fixed in the strip 116 and projecting vertically upward are pins 122, one of the pins being adjacent to each side of each upper leaf spring 112 thus positioning the spring on the strip 116. A corresponding construction positions each lower leaf spring 114.

A glass cloth strip 124 of the same width as the rubber strip 108, running from a supply roll (not shown), is located so as to pass over each upper leaf spring 112 then between the pins 122, over the heating ribbon 110 and the lower leaf spring 114 to a take-up spool (not shown). Suitable mechanism (not shown) keeps the glass cloth strip 124 in tension and allows it to be advanced as needed from time to time as its surface is worn. If desired, a vertical pipe (not shown), perforated along its length, may be secured to the tank face 102 between each pair of ridges 104 and a blast of air delivered through the pipes at the termination of each sealing impulse to cool the sealed areas and loosen them from the glass cloth strip 124. Each assembly comprising a ridge 104 supporting a rubber strip 108, heating ribbon 110 and glass cloth strip 124 is termed a "sealing unit" and designated 126.

A second water jacket or tank 128 of substantially the same construction and dimensions as the tank 100 is located near the tank 100 and adapted for horizontal reciprocation by suitable means (not shown) to and from the alternate position 129, its working surface embodying ridges 130 similar to ridges 104. As shown in FIG. 9, each ridge 130 embodies a land 132 vertically aligned, centered on and adjacent to each land 106. Along the length of each land 132 is bonded a rubber strip 134 comprising two parallel lengthwise raised portions 134a and 134b separated by a lengthwise groove 136 having a width substantially less than the width of a heating ribbon 110. Each assembly comprising a ridge 130 supporting a rubber strip 134 is termed a "pressure unit" and designated 138.

An inlet pipe 140 and an outlet pipe 142 near the top portion of the side walls of the tank 100 allow circulation of a cooling fluid 143. The tank 128 is similarly equipped with pipes 144 and 146 for circulation of a cooling fluid 147. The cooling fluid may be circulated through the tanks by a pump (not shown) located in a reservoir which may be conveniently placed below the machine. Having the films 10 and 12 travel vertically enables the ridges in each tank to be oriented vertically, thus avoiding the trapping of air at any point in either tank.

The tank 128 incorporating the pressure units 138 replaces the pressure bars 68 of FIG. 3 so that the complete apparatus functions as described for the apparatus of FIG. 3 to produce a completed cushioning embodying the cells 148 shown leaving the apparatus in FIG. 8.

Referring to FIG. 10, a special problem is posed by the need for making airtight seals through the varying thicknesses of wrinkles or folds 149 in the lengthwise strip areas to be sealed between the cells 148, especially when the film sheets are relatively thick — say, of the order of 2 to 3 mils each. However, this problem is overcome by the special construction of the sealing unit 126 and pressure unit 138. The rubber strips 134 and 108 allow the heating ribbon 110 to conform under pressure to the irregular contours of the wrinkles and folds. Most important, when the electric impulse is applied to the heating ribbon 110, the heat transmitted to the films in the area spanned by the heating ribbon 110 is dissipated in two dissimilar ways. In the strip areas of film in contact with the rubber strip portions 134a and 134b, the heat is dissipated by conduction at a relatively high rate. However, in the central strip area of film between the strip portions 134a and 134b nothing is in contact with the film so that the heat is dissipated by radiation, therefore at a lower rate. As a result the central strip area of film reaches a much higher temperature than the strip areas of film on each side of it, giving a seal of ideal characteristics.

Thus, a suitable intensity of electrical energy released in the ribbon when sealing, for example, low density clear polyethylene films, each 2 mils thick, provides a seal as shown in FIG. 10 with the central strip area 150 completely fused and transparent through wrinkles and folds. The bordering strip areas 151 and 152, however, are somewhat translucent and may not be completely sealed where the wrinkles and folds are very marked. The resultant seal has a high ability to withstand tensile stress exerted across the seal because the strip areas 151 and 152 yield somewhat under stress, causing the applied tension to be substantially equalized along the length of the seal before full tension is applied to the central fused strip 150.

An optional construction of the pressure unit of FIGS. 7 and 8 is shown in FIGS. 11 and 12. A tank (not shown) of the same construction as the tank 128, but holding air rather than water, embodies ridges 154 each of which has a land 156 on which are cemented parallel rubber strips 158 and 160 separated by a central space. Through the land 156 and between the strips 158 and 160 is a series of closely spaced holes 162 communicating with the interior of the tank 154 which has an inlet for compressed air. Thus, as soon as the sealing impulse is terminated, air may be blasted between the rubber strips 158 and 160, cooling the sealed areas and loosening the hot film from the rubber strips.

FIG. 13 shows a second alternative construction for the sealing section of the conversion apparatus, this being a side elevation, partly in section. In this construction the film sheets are engaged by and given long seals by endless bands while in continuous motion. For clearness of illustration, FIG. 13 shows the apparatus with the component parts stationary and the endless bands disengaged. As further detailed in FIGS. 14 to 16, the film, sheets, designated 210 and 212, travel vertically downward with continuous motion. The film sheets 210 and 212 are shown leaving the cell-shaping section of the apparatus shown in FIGS. 3 and 4 as they travel downward between the forming bars 61 and 62, the embryo cells 213 having been inflated by air injected through the guide tubes 216 and 218. The guide tubes 216 and 218 have, respectively, the slots 216a and 218a.

The film sheets 210 and 212 then pass between and are carried downward by a right-hand array of sealing bands 220 and a left-hand array of pressure bands 222. Each band 220, preferably of steel and of the same width as the forming bars 61 and from 2 to 5 mils in thickness, travels over and is driven by an upper wheel 224 fixed on a horizontal shaft 226 and a lower wheel 228 fixed on a horizontal shaft 230, the inner flight 220a of each sealing band 220 being aligned vertically with the inner face of a forming bar 61. After leaving the wheel 224, each inner flight 220a slides over a land 232 at the apex of a ridge 234 comprising part of a first fluid-filled jacket or tank 236, similar to the tanks shown in FIGS. 7 and 8. The tank 236, preferably filled with oil 237, is heated by an electric resistance unit 238 clamped to the outer wall 236a, the heating unit being controlled by a thermostat (not shown) responsive to the temperature of the oil. After leaving the vicinity of the tank 236, each inner flight 220a slides over a land 240 at the apex of a ridge 242 comprising part of a second fluid-filled tank 244, similar to the tank 236, through which a cooling fluid 245 is circulated by means of the pipes 246 and 248.

Each pressure band 222 is as wide as the forming bars 62 and, as shown in FIG. 15, comprises a base portion 222a of steel of the same width as the forming bars 62 and from two to five mils in thickness, to which are bonded two parallel rubber strips 222b and 222c with a lengthwise space between them. Alternatively, a grooved rubber strip, similar to the strip 134 in FIG. 9, may be used. Each band 222 travels over and is driven by an upper wheel 250 fixed on a horizontal shaft 252 and a lower wheel 254 fixed on a horizontal shaft 256. In the vicinity of the wheel 250, the inner flight 222d of each pressure band is vertically aligned with the inner face of a forming bar 62.

As shown in FIGS. 13 to 16, each inner flight 222d then slides over the right-hand lengthwise face of a pressure bar 258, the end portions of which are received in and free to slide in the notches 260 formed in two stationary cross bars 262, one near the wheel 250 and the other near the wheel 254. Near each end of each pressure bar 258 there is fixed to its left-hand face a vertically disposed leaf spring 264 of the same width as the bar 258, with its free end projecting beyond the end of the bar 258 and bearing on a cross bar 262. An adjusting screw 266 threaded into the center of the left-hand vertical face of each pressure bar 258 is furnished with a lock nut 268 adapted to regulate the length of the screw projecting from the bar 258.

Provision is made for varying the clamping pressure applied to the film sheets by the bands 220 and 222 and removing this pressure when stopping the apparatus, thus preventing overheating of the film material in the areas being long-sealed. Located in a horizontal plane between the cross bars 262 and in a vertical plane between the pressure bars 258 and the return flights 222e of the pressure bands 222 is a horizontal shaft 270 furnished with journals 270a and 270b (see FIG. 14) for rotation in stationary bearings (not shown). The shaft 270 has a central square section 270c to which, adjacent to each pressure bar 258 there is fixed the lower end of a leaf spring 272, the upper end of which bears on the screw 266 in the adjacent pressure bar 258 (see FIG. 13).

A vertically disposed lever 274 with its upper end fixed to one end of the shaft 270 is preferably made of fiber and carries between its ends a contact 276. The lever 274 may be thrown to the alternate position 278 causing the contact 276 to bear on a stationary contact 280 completing an electrical circuit through a drive motor (not shown). This action also causes the leaf springs 272 to force the pressure bars 258 to the right to the alternate positions 282, overcoming the relatively weaker force of the leaf springs 264 and causing them to assume the alternate positions 265. The pressure bars 258, being forced to the right, cause the inner flights of the pressure bands to assume the alternate positions 222f, pressing the film sheet 210 and, in turn, the film sheet 212 against the inner flights 220a of the sealing bands 220.

As shown in FIG. 13, to a stationary bar 284 is fixed the right end of a generally horizontal leaf spring 286, the left end being adapted to engage and lock the lever 274 in position when it is swung to the alternate position 278. Then, depressing the left end of the leaf spring 286 will disengage it and allow the lever 274 to return to its original position. If desired, the tank 236 may be mounted on horizontal ways (not shown) so that it may be removed from contact with the bands 220 when stopping the machine, thus providing an alternate means of preventing overheating of the film material in the areas being long-sealed.

It is desirable that substantially the same pressure be exerted by each of the pressure bars 258 on the pressure band with which it is in contact in order that all seals made have uniform quality. Accordingly, the pressure exerted by each bar 258 may be adjusted by varying the distance by which each adjusting screw 266 projects from its bar 258, each screw 266 being finally secured by tightening its lock nut 268. The tanks 236 and 244 are shown as having the same relative length for ease of illustration, but may actually differ in length, if desired. The wheels 224, 228, 250 and 254 and the discs 78 and 82 are connected by suitable gearing (not shown) to the drive motor previously referred to, the motor being energized electrically through the contacts 276 and 280.

The cushioning material made by the apparatus may desirably have a width of 24 inches with long seals 3 inches apart so that the apparatus would have nine sealing bands and nine pressure bands. The bands would preferably be made to exactly the same dimensions in a jig, thus assuring equal tension in all the bands. If desired, an elastomer coating may be bonded to the outer surface of the various wheels driving the bands to reduce slippage.

In FIG. 13 the vertical distance or zone of travel of the film sheets between the plane of the axes of the upper wheels 224 and 250 and the top of the tank 236 is designated $a - b$. If desired, inflation and cell-shaping may be allowed to take place only in this zone of travel and the forming bars 61 and 62 eliminated, the relative length of the zone of travel $a - b$ being increased beyond that shown in the drawing if desired.

The operation of the apparatus will now be described beginning with the film sheets 210 and 212 stationary in the starting position shown and with the fluids in the tanks 236 and 244 at proper temperatures. The lever 274 is thrown to the left, as viewed in FIG. 13, closing the contacts 276 and 278 and starting the drive motor, thus placing the wheels, bands and discs in motion and advancing the film sheets through the apparatus. At the same time, the film sheets are gripped at spaced intervals between the heated sealing bands 220 and the pressure bands 222 so that as the bands carry the film sheets past the tank 236, heat is transmitted through the bands 220, fusing the film material in the longitudinal areas between the embryo cells 213. Then, as the bands carry the film sheets past the cooling tank 244, the bands 220 and, in turn, the fused areas, are cooled, thus completing the formation of the long seals and of the completed air cells 280.

In the various methods of construction described, it is preferable, as shown in FIG. 3, that the guide tubes 73 extend through both the cell-shaping and sealing sections. However, the guide tubes may extend through only the cell-shaping section, if desired.

One conversion apparatus can produce a variety of cushionings, each having cells of different shape and volume than the others. For example, assume that in the apparatus of FIG. 1, six different sealing rolls are provided, these having, respectively, sealing bars 28 on the following centers: ½, 1, 1 ½, 2, 2 ½ and 3 inches. This enables six different prefabs to be made having, respectively, the same cross seal spacings. Assuming that the conversion apparatus is constructed to make long seals three inches apart across the width of the prefab, then the prefabs noted above would be converted into cushionings having cells, respectively, ½ × 3, 1 × 3, 1 ½ × 3, 2 × 3, 2 ½ × 3, and 3 × 3 inches in size. These cushionings may be further modified by varying their resilience through changes in the pressure of the air injected through the guide tubes.

The crosswise shrinkage of the prefab, after its conversion into cushioning, may vary from 2 percent for prefabs having a ½-inch cross seal spacing to about 9 percent for those having a 3-inch spacing. All prefabs are preferably designed to run through conversion apparatus having a fixed standard spacing of guide tubes. This makes it desirable to vary the width of the sheets from which the prefabs are made according to the cross seal spacing. However, experiment shows that this requirement is not critical and a relatively wide tolerance is permissible while still obtaining wellfilled cells. Therefore, for example, the six prefabs cited above may be made from film sheets of, say, three different widths. Thus, assuming the final cushioning material to be in all cases 24 inches wide, one width of 25 ¾ inches would be used to make the first two prefabs, a second width of 27 ¼ inches to make the next two, and a third width of 27 ¼ inches to make the last two. In each case, one inch has been added to allow for waste at the slit margins, which is about 4 percent.

The apparatus of FIG. 1 may be easily adapted to the above-stated requirements by making the rolls and belts of suitable dimensions to handle the widest prefab. Each of the six interchangeable sealing rolls 26 would be designed to make cross seals of the length best suited to its particular cross seal spacing.

An advantage of the conversion apparatus in all the embodiments described above is that it is simple enough to operate automatically without attendance most of the time. If desired, it may readily include means giving a suitable signal when a full roll of cushioning material is to be removed or when the supply roll of prefab is to be renewed. However, the greatest advantage in making cushioning by the apparatus and methods of the invention is the lower material cost required per cubic foot of cushioning for cells of comparable strength. For example, a test of a stack of prototype samples of cushioning material having seal lines on 2 × 3 inch spacing (as measured before inflation) showed, when the cushioning was inflated and sealed, a yield of 2.96 cubic feet of cushioning per pound of one-mil PVDC-coated polyethylene film.

I claim:

1. A method for the manufacture of a closed-cell cushioning material from a prefab, said prefab comprising longitudinally-extending flat sheets of thermoplastic films with said sheets in superposed relationship to one another and defining exposed outer faces, said prefab having longitudinal marginal seals and transversely-extending spaced cross seals terminating relatively adjacent to but spaced from said marginal seals, the method comprising maintaining longitudinal tension on said sheets, longitudinally advancing said sheets while maintaining said marginal seals in predetermined relationship to each other, introducing a gas under pressure into the unsealed spaces between said sheets during said advancement to inflate the same and simultaneously limiting said inflation to a predetermined extent along spaced longitudinal lines of said sheets, and thereafter forming long seals by sealing said sheets together along said spaced longitudinal lines.

2. A method according to claim 1 including the step of distorting said sheets to reduce the distance between said marginal seals prior to said step of maintaining said marginal seals in predetermined spaced relationship to each other.

3. A method according to claim 1 wherein said advancement of said sheets is intermittent and said step of forming said long seals is performed while said sheets are stationary.

4. A method according to claim 2 wherein said step of forming said long seals includes supporting said sheets at one exposed face thereof and applying heat and pressure to the other exposed face of said sheets along said spaced longitudinal lines.

5. A method according to claim 4 including the step of subjecting said long seals to the action of a cooling medium.

6. An apparatus for the production of closed-cell cushioning material from a prefab, said prefab comprising longitudinally-extending flat sheets of a thermoplastic material with said sheets in superimposed relationship to one another and defining exposed outer faces and said superimposed sheets having longitudinally-extending marginal seals and transversely-extending spaced cross seals terminating relatively adjacent to but spaced from said marginal seals, the apparatus comprising means for longitudinally advancing said sheets, means for maintaining said marginal seals in predetermined spaced relationship, means for introducing a gas under pressure into the unsealed spaces between said cross seals to inflate the same, means limiting the inflation of said spaces along spaced longitudinal lines of said sheets and means for thereafter bringing said sheets into contact with each other along said longitudinal lines and for sealing said sheets together on said lines of contact.

7. An apparatus as defined in claim 6 additionally including means for distorting said sheets to reduce the distance between said marginal seals and means supporting said distorting means for the performance of its said function prior to the performance of the function of said means for maintaining the marginal seals in predetermined spaced relationship.

8. An apparatus as defined in claim 7 wherein said means for distorting said sheets comprises means spaced transversely of said sheets and engaging and pressing an exposed face of said sheets in one direction and means spaced transversely of said sheets and positioned intermediate said first mentioned pressing means engaging and pressing the other exposed face of said sheets in the opposite direction.

9. An apparatus as defined in claim 8 wherein there is means for adjusting the pressures against said sheets exerted by said pressing means.

10. An apparatus as defined in claim 6 wherein there is means cooperating with said sheet advancing means for maintaining longitudinal tension on said sheets.

11. An apparatus as defined in claim 6 wherein said means limiting the inflation of said spaces along spaced longitudinal lines comprises a first set of forming elements extended longitudinally of said sheets in overlying relationship to one exposed face thereof and a second set of forming elements extending longitudinally of said sheets in opposed relationship to said first set of forming elements and in underlying relationship to the other exposed face of said sheets and means supporting said first and second elements in said positions.

12. An apparatus as defined in claim 11 wherein said means supporting at least one of said sets of forming elements includes means for adjustment of the set of forming elements supported thereby toward and away from the other set.

13. An apparatus as defined in claim 11 wherein said means for bringing said sheets into contact with each other along longitudinal lines and for sealing said sheets together on said lines of contact comprises a set of sealing elements in longitudinal alignment with one of said sets of forming elements and a set of pressure elements in longitudinal alignment with the other of said sets of forming elements and there is means supporting said set of pressure elements for movement toward and away from said set of sealing elements.

14. An apparatus as defined in claim 13 wherein said sealing elements each include a linear heating means of a given width and said pressure elements each comprise linear insulating means in opposed relationship to a linear heating means, said insulating means defining a groove of less width than said given width of said heating means.

* * * * *